United States Patent

Lavigne

[15] 3,675,031
[45] July 4, 1972

[54] HEAT-TO-ELECTRIC POWER CONVERTER

[72] Inventor: Pierre Lavigne, Grenoble, France

[73] Assignee: Commissariat A L'Energie Atomique, Paris, France

[22] Filed: Nov. 18, 1970

[21] Appl. No.: 90,645

[30] Foreign Application Priority Data

Nov. 27, 1969 France..................................6940996

[52] U.S. Cl.......................................290/1, 310/27, 123/46
[51] Int. Cl. ................................................H02k 35/02
[58] Field of Search ...................290/1, 1 A; 123/46; 310/27

[56] References Cited

UNITED STATES PATENTS

| | | | |
|---|---|---|---|
| 3,465,161 | 9/1969 | Cutkosky | 290/1 |
| 2,995,122 | 8/1961 | Randall | 290/1 |
| 2,334,688 | 11/1943 | Norton | 290/1 |
| 2,900,592 | 8/1959 | Baruch | 290/1 X |
| 3,102,205 | 8/1963 | Combs | 290/1 |
| 3,443,111 | 5/1969 | Monpetit | 290/1 |
| 2,362,151 | 11/1944 | Ostenberg | 290/1 |

*Primary Examiner*—G. R. Simmons
*Attorney*—Cameron, Kerkam & Sutton

[57] ABSTRACT

The converter comprises a linear alternator consisting of a stationary armature and a field winding which is capable of linear reciprocating motion within the armature. A fluid is circulated within a closed loop system so as to operate a driving machine constituted by an expansion section and a compression section each containing a piston directly connected to the field winding for carrying out the reciprocating motion and causing simultaneous expansion and compression of the fluid within the two sections. The hot fluid which is discharged from the expansion section and the cold fluid which is discharged from the compression section are circulated in two circuits in opposite directions within a heat exchanger and then fed back respectively into the compression section and the expansion section.

2 Claims, 3 Drawing Figures

3,675,031

HEAT-TO-ELECTRIC POWER CONVERTER

This invention is concerned with a converter for the conversion of heat to electrical energy and more specifically with a device for the utilization of a fluid in a circulation loop system which approximates an Ericsson cycle with a view to converting the heat generated by a thermal source to electrical alternating-current energy.

Although the problem of "heat-to-electricity" conversion is wholly solved at the present time when using fluid fuels and in the case of either high power outputs (turbo-alternator) or medium and low power outputs (internal combustion engine driving an alternating-current generator); there is nevertheless no reliable and efficient system which is capable of constituting a low-power converter and calls for the use of an external heat source for a number of essential reasons such as noise, atmospheric pollution, use of radioelements and the like.

The present invention provides a solution to this problem and accordingly proposes a heat-to-electric power converter which essentially comprises a linear alternator constituted by a stationary armature and a field winding which is linearly movable within said armature and a driving machine operating with a fluid in a circulation loop system and comprising :

two sections referred-to as the expansion section and compression section and each having a piston which is directly connected to the field winding in order to endow said winding with reciprocating motion within said armature, the expansion and compression of said fluid being carried out respectively and simultaneously within said two sections when said pistons move in a given direction, an elastic system for returning said pistons in the opposite direction, and a heat exchanger within which the hot fluid discharged from the expansion section and the cold fluid discharged from the compression section are circulated within two circuits in opposite directions and then fed back respectively into the compression section and the expansion section.

Further properties of this invention will be brought out by the following description of one embodiment of said converter which is given by way of explanation but not in any sense by way of limitation, reference being made to the accompanying drawings, in which.

Figure 1:
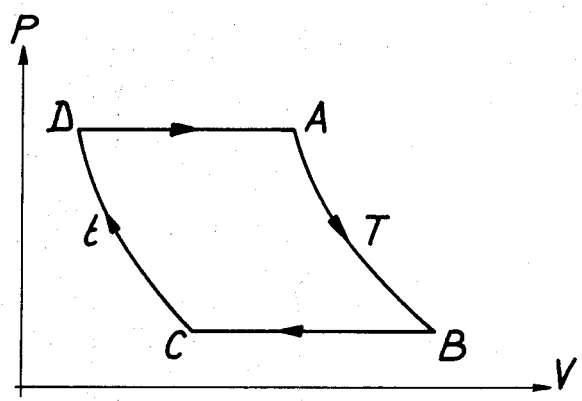
FIG. 1 is a Clapeyron diagram representing the Ericsson cycle through which a fluid passes.
Figure 2:
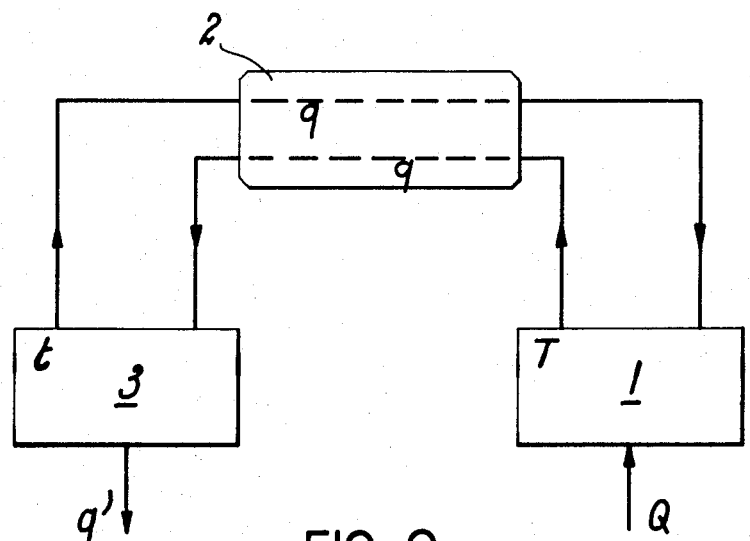
FIG. 2 is an explanatory diagram relating to the description of the Ericsson cycle.

The converter in accordance with the invention operates on a cycle which represents the nearest possible approach to the Ericsson cycle and utilizes a fluid in a closed circulation system ; the Ericsson cycle is shown in FIG. 1 in a Clapeyron diagram, that is to say with the coordinates P (pressure) and V (volume). FIG. 2 shows diagrammatically the different components which are necessary in order to carry out a cycle of this type. Between A and B, the gaseous fluid undergoes expansion within a chamber 1 at the temperature T while absorbing the heat Q which is derived from a heat source. The portion BC corresponds to cooling of the fluid within a heat exchanger 2 to which said fluid transfers the heat $q$. Between C and D, said fluid is compressed within a chamber 3 at the temperature $t$ and releases the heat $q'$. Finally, the portion DA corresponds to re-heating of the fluid at the temperature T within the heat exchanger 2 in which it absorbs a value of heat $q$ equal to the heat released by the fluid which circulates in the opposite direction. The gaseous fluid then passes into the expansion chamber 1 and the mechanical energy which is recovered is theoretically equal to the difference $Q - q'$.

Figure 3:
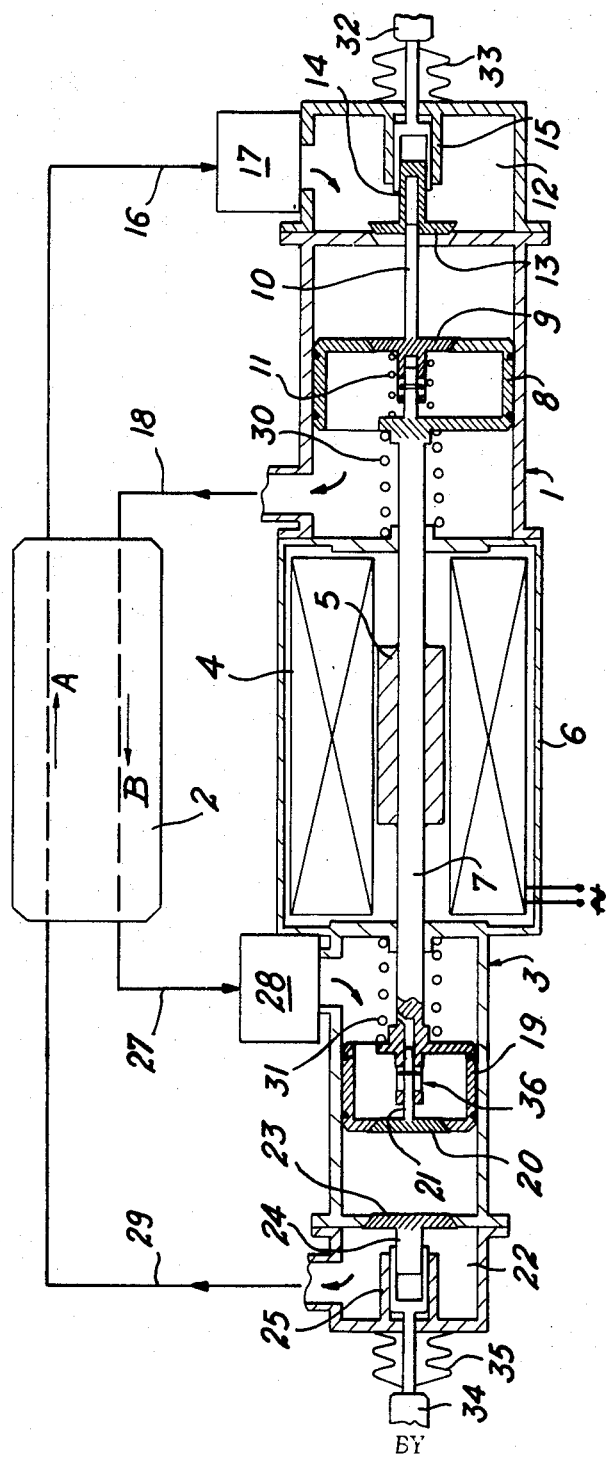
FIG. 3 illustrates a "heat-to-electric power" converter in accordance with the invention.

The converter in accordance with the invention as shown in FIG. 3 makes use of said energy in order to carry out the reciprocating movements of the field winding of a linear alternator. To this end, the converter employs a driving machine whose moving system is directly coupled to said field winding and has two well-defined sections referred-to as the expansion section and compression section. The processes of expansion of the fluid while absorbing heat and compression of said fluid while releasing heat are carried out simultaneously within said sections. However, since the heat transfer processes during expansion and compression give rise to particularly difficult technological problems, the converter preferably operates on an "approximate" Ericsson cycle which differs from the "perfect" Ericsson cycle in pre-heating of the fluid which absorbs the heat $Q_1$ prior to its admission in the expansion chamber and in pre-cooling of said fluid which releases the heat $q'_1$ prior to its introduction into the compression chamber so that, at energies developed which are respectively equal, the heat supplied to the fluid during its expansion is $Q - Q_1$ and the heat released during the compression is $q' - q'_1$.

The linear alternator is of conventional design and essentially comprises a stationary armature 4 and a field winding 5 which is capable of moving within said armature. Under the action of the reciprocating motion of the field winding 5 within the armature 4, an alternating-current voltage having a frequency equal to that of said motion is collected at the terminals of said armature.

The alternator which appears to be best suited to this application is the variable-reluctance type in which the field winding is constituted by a pallet formed of permeable laminations.

A first cylindrical chamber 1 which constitutes the expansion chamber and has the same axis as the motion to be imparted to the field winding 5 is mounted in leak-tight manner against the alternator casing 6 at one end of this latter. Said chamber is heated from the exterior by means which are not illustrated and by employing the source of heat to be converted to electrical energy. The field winding 5 is mounted on a rod 7 which is rigidly fixed to a hollow piston 8, said piston being capable of sliding within the chamber 1 and formed by a cylinder having a diametrical wall pierced by a central opening. Said opening serves as a seat for a valve 9 and this latter is capable of sliding along an axial rod 10 which forms an extension of the rod 7 and on which a spring 11 exerts a continuous thrust which tends to lift said valve from its seat. A chamber 12 or so-called admission chamber is mounted against the end of the cylinder 1 and communicates with this latter by means of a valve 13. An axial stem 14 of said valve is located within the interior of the admission chamber 12. Externally, said stem forms a piston and is slidably mounted within a cylinder 15 which is fixed to the base of said chamber, the position of said piston being adjustable axially from the exterior by means of a control stop 32 and a bellows seal 33. Internally, said axial stem 14 forms a cylinder within which the rod 10 is slidably fitted. Provision is thus made for two fluid springs which serve to control the valve 13 and only entail linear axial movements.

The driving gaseous fluid derived from the circuit A of a heat exchanger 2 is admitted through a pipe 16 into a heater 17 which is supplied with heat from the source and communicates with the admission chamber 12. The fluid which passes out of the expansion chamber 1 is returned through a pipe 18 into the circuit B of said heat exchanger and circulates within this latter in the direction opposite to the fluid which flows within the circuit A, thus permitting continuous heat transfer between the two fluids.

A second cylindrical chamber 3 which constitutes the compression chamber is mounted in leak-tight manner against the casing 6 at the other end of the linear alternator in the axis of the expansion chamber 1. Said chamber is cooled externally by means which are not shown in the drawings.

A hollow piston 19 is rigidly fixed to that extremity of the rod 7 which supports the field winding 5 and is slidably mounted within the chamber 3. In the same manner as the piston 8 of the expansion chamber 1, said piston 19 is formed by a cylinder having a diametrical wall pierced by a central opening which serves as a seat for a valve 20. Said valve is free or, in other words, opening and closing of the valve are carried out as a result of pressure differences within the two sections of the compression chamber 3. To this end, said valve is simply provided with an axial stem 21 slidably fitted in a cylinder which is formed at the extremity of the rod 7 and which communicates with the chamber 3. An abutment member 36 limits the extent of opening of the valve. A chamber 22 or so-called discharge chamber is mounted against the end of the cylinder 3 and communicates with this latter through a valve 23. Said valve is provided inside the chamber 22 with an axial stem 24 which is slidably fitted within a cylinder 25, the position of said stem being adjustable axially by means of an externally-operated stop 34 and a bellows element 35. This valve can also be a free valve.

The driving fluid derived from the circuit B of the heat exchanger 2 into which the fluid discharged from the chamber 1 has been admitted is conveyed through a pipe 27 into a cooling unit 28 which communicates with the compression chamber 3. The fluid which is discharged from the chamber 22 is returned through a pipe 29 into the circuit A of said heat exchanger which feeds the admission chamber 12. Finally, two springs 30 and 31 which work in opposition at the two ends of the linear alternator and are applied at one end against the casing 6 and at the other end against the pistons 8 and 19 respectively form an elastic restoring system which defines an acceleration phase followed by a deceleration phase in the case of each movement of the field winding 5.

The converter as herein described operates in accordance with the following mode of operation. The initial stage selected is that in which on the one hand the valve 13 is open and the valve 9 is closed and, on the other hand, the valves 20 and 23 are both closed. The fluid which is supplied from the circuit A of the heat exchanger 2 and has passed through the heater 17 is therefore admitted into the expansion chamber 1 and the moving system carries out a displacement towards the left in a movement to which the elastic restoring system formed by the springs 30 and 31 imparts an acceleration phase (the spring 30 which is in extension tends to be put in compression whereas the spring 31 which is in compression tends to expand) followed by a deceleration phase (the spring 30 prevents its compression whereas the spring 31 prevents its extension).

During this movement towards the left which constitutes the admission stage, the compressed gas within the cylinder 14 maintains the valve 13 in the open position and after a predetermined travel of the moving system, said valve closes again when the pressure within said cylinder 14 is close in value to the pressure within the chamber 12. There then takes place a phase of expansion of the gas within the chamber 1 which is heated externally and the valve 9 remains applied against its seal as a result of the difference in pressure until the spring 11 is capable of lifting said valve at the end of travel. A fixed stop which is not shown can assist the lifting movement of the valve. The hot gas then passes into the circuit B of the heat exchanger 2, is cooled within this latter and transfers heat to the gas which circulates in the opposite direction within the circuit A.

During the same displacement of the moving system towards the left and simultaneously with the phases of admission and expansion within the chamber 1, the gas which originates from the circuit B of the heat exchanger and which has passed through the cooling unit 28 into the chamber 3 is compressed until the pressure within the compression chamber 3 becomes slightly higher than the pressure within the discharge chamber 22 and initiates opening of the valve 23 which will allow the cooled fluid to pass towards the circuit A of the heat exchanger 2, then to be heated therein and to absorb heat from the gas which circulates in the opposite direction within the circuit B.

Under the action of the elastic restoring system, the moving system then moves again towards the right. There therefore takes place a downward displacement of the piston 10 within the cylinder of the valve 13 which is held against its seat as a result of the pressure existing within the admission chamber 12 until an abutment member or stop provided on the valve 9 strikes the valve 13 and thus causes closure of the valve 9 followed by opening of the valve 13. The cycle has thus reverted to the initial stage. From the beginning of this movement of the moving system towards the right, the valve 20 being closed and the pressure within the discharge chamber 22 being higher than the pressure within the compression chamber 3, the valve 23 closes again with the aid of the pressure developed within the cylinder 25. The pressure within the chamber 3 immediately decreases : the fluid derived from the cooling unit 28 opens the valve 20 and fills the chamber 3. The pressure within said chamber finally results in closure of the valve 20, both valves 20 and 23 being thus closed and the initial stage is again restored.

In short, the stages of admission and expansion within the chamber 1 on the one hand and the stages of compression and discharge within the chamber 3 on the other hand thus take place at the same time when the moving system is displaced towards the left while the stages of exhaust within the cylinder 1 and filling within the cylinder 3 take place when said system moves towards the right.

As the process thus continues, there is obtained a reciprocating motion of the fluid winding 5 within the armature 4, with the result that a periodic electric voltage having the same frequency as said motion can be collected at the armature terminals.

It is important to note that, if the two sections (springs 30 and 31) of the elastic restoring system are identical, the electric power is supplied only during the driving stage, that is to say at the time of displacement of the moving system towards the left. On the other hand, if these two sections are dissymmetrical, the elastic system restores part of the energy at the time of displacement towards the right and the electric power is supplied during both stages.

Taking no account of the functions of the heater 17 and cooler 28 which cause the fluid to go through an "approximate" Ericsson cycle, the different phases of the cycle shown in FIG. 1 are in fact met with in this process : the phase AB of expansion of the gas and absorption of the heat Q is defined by the time interval between the instant of closure of the valve 13 and the instant of opening of the valve 9. The phase BC of cooling and release of the heat $q$ corresponds to the flow of gas within the circuit B of the heat exchanger 2. The phase CD of compression of the gas and release of the heat $q'$ is defined by the time interval between the instant of closure of the valve 20 and the instant of opening of the valve 23. Finally, the phase DC of re-heating of the gas and absorption of the heat $q$ corresponds to the flow of said gas within the circuit A of the heat exchanger 2 in the direction opposite to the gas flow within the circuit B.

It can readily be observed that the arrangement according to the invention reduces friction problems to a considerable extent since no pair of surfaces in relative sliding motion is subjected to a solid pressure force ; the dry friction which is accordingly permitted does not result in any contamination of the gas. Moreover, imperviousness to the atmosphere which is essential in order to ensure length of service of the converter can be ensured with particularly great ease by reason of the fact that only the lead-out connections from the armature 4 pass through the casing 6 to which the two chambers 1 and 3 are sealed. Furthermore, the converter is relatively simple to construct, is thus endowed with a high degree of reliability and is low in capital cost. Finally, the cycle which is employed permits the achievement of a very acceptable degree of efficiency which approaches that of the Carnot cycle and even more so as the specific power decreases. For this reason, the converter as herein described is particularly suitable in the low power range.

It is readily apparent that the present invention is not limited solely to the embodiment which has been described by way of example with reference to the drawings and that the scope of this patent also extends to alternative forms of either all or part of the arrangements described which remain within the definition of equivalent means as well as to any application of such arrangements. In particular, the elastic systems of the fluid spring type can undoubtedly be provided by any other combinations of cylinders and pistons. It is also wholly evident that fluid springs other than mechanical springs can be employed.

We claim:

1. A converter for the conversion of heat to electrical energy comprising a linear alternator constituted by a stationary armature and a filed winding which is linearly movable within said armature and a driving machine operating with a fluid in a circulation loop system and comprising an expansion section and a compression section and each having a piston directly connected to the field winding to endow said winding with reciprocating motion within said armature, the expansion of said fluid while absorbing heat derived from a heat source and the compression of said fluid while restoring heat being carried out respectively and similtaneously within said two sections when said pistons move in a given direction, an elastic system for returning said pistons in the opposite direction, and a heat exchanger within which the hot fluid discharged from the expansion section and the cold fluid discharged from the compression section are circulated within two circuits in opposite directions and then fed back respectively into the compression section and the expansion section, the expansion section comprising a cylindrical chamber which is placed at one end of the armature in the axis of the movement to be imparted to the field winding and which can be heated externally by said heat source, a piston coupled to said field winding by means of a rod, said piston being slidably mounted within said chamber and formed by a cylinder having a diametrical wall which is pierced by a central opening, a valve for shutting off said opening, an admission box mounted against the end of said chamber, a valve for putting said admission box into communication with said cylindrical chamber, and an elastic system having axial linear movements and intended to control said valves, and wherein the compression section comprises:

a cylindrical chamber which is placed at the other end of the armature in the same axis as the cylindrical chamber of the expansion section and which can be cooled externally, a piston rigidly fixed to said rod, said piston being slidably mounted within said chamber and formed by a cylinder having a diametrical wall which is pierced by a central opening, a free valve which is intended to shut off said opening, a discharge box which is mounted against the end of said chamber, and a free valve for putting said discharge box into communication with said cylindrical chamber, the two circuits of the heat exchanger being connected in one case between said discharge box and said admission box and in the other case between the cylindrical chambers of the expansion and compression sections.

2. A converter according to claim 1 and further including a heating unit for heating the fluid which is admitted into the expansion section, and a cooling unit for cooling the fluid which is admitted into the compression section.

* * * * *